United States Patent Office.

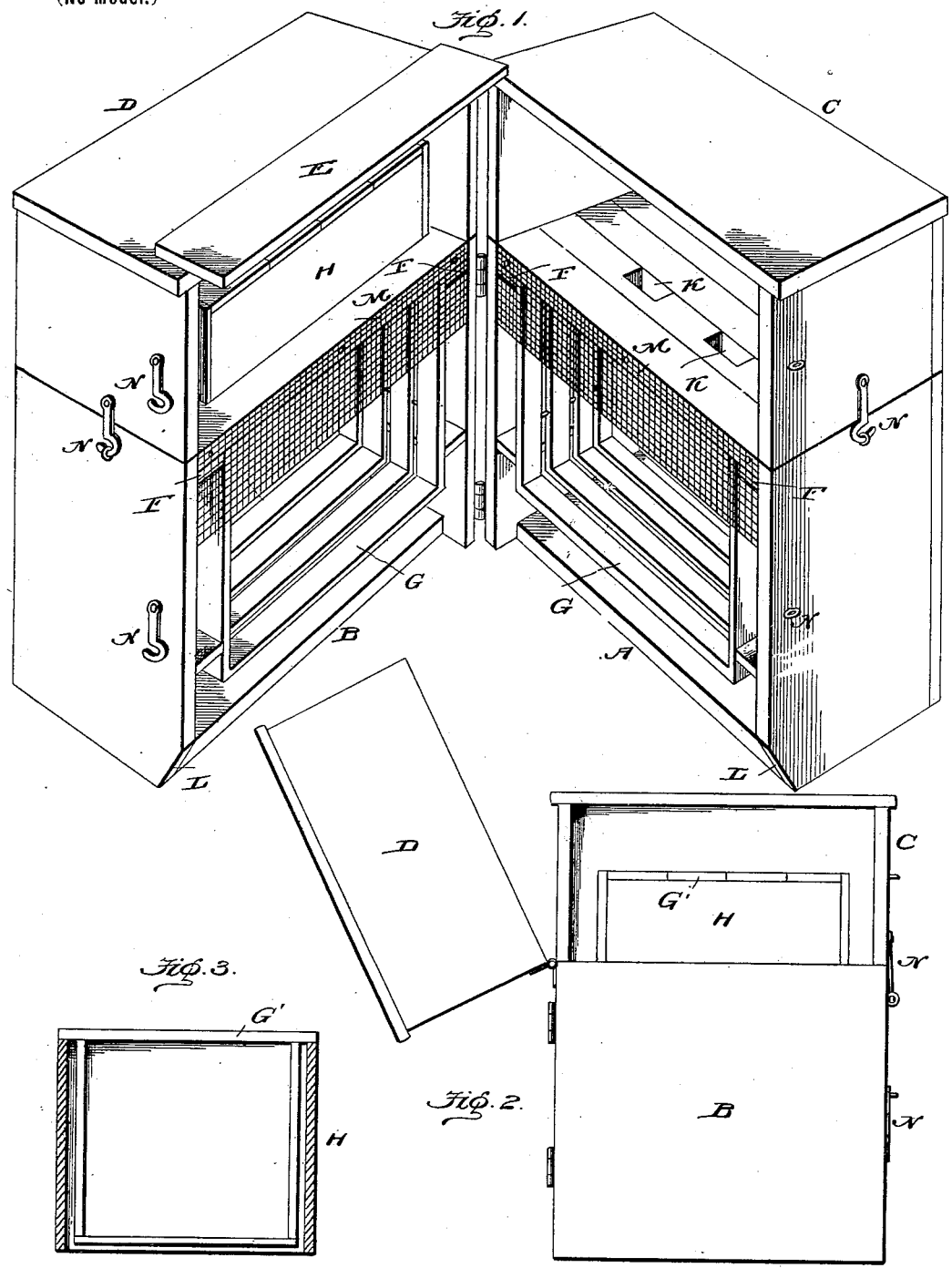

JOSHUA HARTMAN, OF KNOX, INDIANA.

BEEHIVE.

SPECIFICATION forming part of Letters Patent No. 630,828, dated August 8, 1899.

Application filed August 17, 1898. Serial No. 688,833. (No model.)

*To all whom it may concern:*

Be it known that I, JOSHUA HARTMAN, a citizen of the United States, residing at Knox, in the county of Starke and State of Indiana, have invented new and useful Improvements in Beehives, of which the following is a specification.

My invention relates to improvements in beehives; and the object of my invention is the provision of a beehive which is readily accessible to both the bees and the person removing the honey-frames therefrom and placing them therein.

Another object of my invention is the provision of a beehive which is very simple, durable, and cheap, thus producing a very useful and practical article.

To attain the desired objects, the invention consists of a beehive embodying novel features of construction and arrangement of parts, substantially as disclosed herein.

Figure 1 is a perspective view of my complete beehive opened. Fig. 2 is a side elevation of my hive with one of the top sections open, and Fig. 3 is a cross-section through one of the honey-box-supporting frames.

In the drawings, A designates a lower quarter or section of my hive, and hinged thereto at its back vertical edge is the other lower quarter or section B. Secured upon the upper edges of the rear sides of these sections are the two top quarters or sections C and D, and thus it will be seen that the two top sections may be swung backward and that the lower sections may be swung apart to allow the hive to be readily accessible.

Over the meeting edges and secured to one of the top sections is the overlapping strip E, which prevents snow or rain from entering the hive.

Near the upper edges of the lower sections are secured the partitions or strips F, which allow the frames G to be placed thereon and hang downwardly, and adapted to be placed upon the top of these frames are the supports or frames H, which allow the honey frames or boxes G' to be placed in the top sections of the hives.

In the top of the frames G are the openings K, which allow the bees an entrance and exit to and from the honey-box frames in the upper sections. I provide an opening L at the front meeting edges of the lower sections in order that the bees may be admitted to the hive and secure the pieces of net or gauze M to the upper outside face of the outer frames G.

To securely hold the sections together when in use, I employ the hooks and eyes N, which may be fastened in any well-known way to hold the sections together.

From this description the use and operation of my beehive will be fully understood and its numerous advantages fully appreciated; but the operation, briefly stated, is as follows: The hive is swung centrally open, and the top sections one at a time may then be swung backward to open the whole hive; but, if desired, one section at a time may be opened without disturbing the other sections of the hive when a frame is to be removed and a new one placed in the hive.

It is evident that I provide a very simple, durable, and cheap beehive which is very useful and thoroughly practical.

I claim—

1. A beehive, consisting of two lower sections hinged together longitudinally and two other sections resting on top of these sections hinged together transversely, each section being made fast and secured by means of hooks and eyes.

2. A beehive, consisting of two lower sections hinged together, two top sections hinged to opposite lower sections, and means to secure all the sections together to make a hive.

3. A beehive, consisting of two lower sections hinged together, two top sections each hinged to its opposite lower section and adapted to have a different swing in relation to the lower sections, means to hold the sections together to form a hive, and removable honey-frame-supporting devices located in the sections.

4. A beehive, consisting of two lower sections hinged together, two upper sections each hinged to its opposite lower section, means to lock the sections together to form a housing or hive, and an opening provided in the meeting edges of the lower sections to admit the bees to the hive.

JOSHUA HARTMAN.

Witnesses:
W. T. MARVIN,
G. W. WAGONER.